US012809767B2

(12) United States Patent
Akavaram et al.

(10) Patent No.: US 12,809,767 B2
(45) Date of Patent: Nov. 24, 2026

(54) CONFIGURABLE BOOSTER

(71) Applicant: QUALCOMM Incorporated, San Diego, CA (US)

(72) Inventors: Santhosh Reddy Akavaram, Hyderabad (IN); Sai Praneeth Sreeram, Anantapur (IN); Chintalapati Bharath Sai Varma, Hyderabad (IN); Madhu Yashwanth Boenapalli, Hyderabad (IN); Sang Tran, Encinitas, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 18/960,503

(22) Filed: Nov. 26, 2024

(65) Prior Publication Data

US 2026/0147706 A1 May 28, 2026

(51) Int. Cl.
*G06F 12/02* (2006.01)
*G06F 3/06* (2006.01)

(52) U.S. Cl.
CPC ........ *G06F 12/0246* (2013.01); *G06F 3/0613* (2013.01); *G06F 3/0656* (2013.01); *G06F 3/0679* (2013.01); *G06F 2212/7202* (2013.01)

(58) Field of Classification Search
None
See application file for complete search history.

(56) References Cited

U.S. PATENT DOCUMENTS

| | | | | |
|---|---|---|---|---|
| 11,586,385 | B1 * | 2/2023 | Lercari | G06F 12/0246 |
| 2022/0066692 | A1 * | 3/2022 | Noh | G06F 3/0604 |
| 2023/0147477 | A1 * | 5/2023 | Kim | G06F 3/061 711/154 |
| 2024/0319913 | A1 * | 9/2024 | Akavaram | G06F 3/0659 |
| 2024/0320142 | A1 * | 9/2024 | Lai | G06F 12/0246 |
| 2025/0094337 | A1 * | 3/2025 | Sasaki | G06F 12/0246 |

* cited by examiner

*Primary Examiner* — Kaushikkumar M Patel
(74) *Attorney, Agent, or Firm* — NORTON ROSE FULBRIGHT US LLP

(57) ABSTRACT

This disclosure provides systems, methods, and devices for memory systems that support efficiently utilizing and distributing buffers to logical units of the memory device based on buffer utilization. In a first aspect, a method of accessing data in a flash memory system includes a host memory controller receiving, by the memory controller of a host device, one or more write requests in a first queue associated with a first logical unit, where the first logical unit is associated with at least a first buffer and a second buffer. The host memory writes the one or more write requests to the first buffer. The host memory, in response to a quantity of requests associated with the first buffer reaching a threshold quantity of requests for the first buffer, writes the one or more write requests to the second buffer. Other aspects and features are also claimed and described.

20 Claims, 9 Drawing Sheets

CONFIGURABLE BOOSTER

TECHNICAL FIELD

Aspects of the present disclosure relate generally to an apparatus and method for controlling a memory device. Some aspects may, more particularly, relate to an apparatus and method for controlling operations for efficiently utilizing and distributing buffers to logical units of the memory device based on buffer utilization.

INTRODUCTION

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

A memory system may, in some cases, be integrated with or otherwise connected to a host device, such as an electronic device. For example, memory systems may be integrated with host devices in a system on chip (SoC). As one particular example, a flash memory system, which may be a universal flash storage (UFS) memory system, may be integrated into an electronic device, such as an access point (AP), station (STA), user equipment (UE), base station, modem, camera, automobile, or other system.

One standard for organization and operation of electronic memory devices is the Universal Flash Storage (UFS) standard. The UFS standard was introduced as a successor to the eMMC (embedded MultiMediaCard) standard to offer higher performance and lower power consumption for mobile and other embedded devices. UFS provides support for a range of features such as multi-lane configurations, command queuing, and power-saving modes that enable high-speed data transfer rates, low latency, and long battery life. The UFS standard specifies many parameters for structuring, reading data from, and writing data to UFS-compliant memory devices. For example, UFS-compliant devices may include digital cameras, mobile phones, consumer electronic devices, and other devices with internal memory capacity. UFS-compliant memory may include memory embedded within electronic devices and removable memory cards, and UFS memory devices may implement NAND flash memory.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A storage system may be divided into logical units (LUNs) for storing and accessing data in an organized manner. For example, a solid state drive (SSD) may be divided into multiple logical units (LUNs) along boundaries between individually-accessible portions of the SSD. If the SSD has eight blocks of memory cells that can each be accessed in parallel with each other, then the SSD may be divided into eight LUNs. Each of the groups of memory cells designated as LUNs may be associated with an additional group of memory cells that are assigned as a write buffer for the LUN. A write buffer increases performance of the storage system. In some embodiments, a group of memory cells in a LUN may be configured as multiple-level cells (MLCs) in which each memory cell stores multiple bits of data. MLCs may have lower performance than cells configured as single-level cells (SLCs) in which each memory cell stores only a single bit of data. MLCs provide increased storage density, and thus the ability to store more user data. The lower-performance of the MLCs may be balanced through the use of a write buffer of higher performance cells such as SLCs. The write buffer, however, uses memory cells for performance enhancement, which makes the memory cells unavailable for data storage. Thus, there is a trade-off between performance and storage because larger write buffers offer increased performance but decrease storage size.

To efficiently utilize write buffers (e.g., buffers, single-level cell memory) of a flash memory device, the flash memory device may be configured to assign each logical unit of the flash memory to use at least two buffers for write operations. For example, a logical unit may be associated with a first buffer, which may be a dedicated buffer for the logical unit, and at least a second buffer. This sharing of write buffers between LUNs improves the trade-off between performance and storage by effectively providing a larger write buffer to each LUN without a reduction in storage space that would occur if each individual write buffer was increased in size. Accordingly, if the first buffer is completely utilized (e.g., full), then incoming or queued write requests for the LUN may be written to the second buffer. The second buffer may be assigned to other LUNs as well, such as a second LUN. That is, the second buffer may be a hybrid buffer that is associated with both the first LUN and the second LUN, such that the buffer can be used by either or both LUNs. In this example, write buffers associated with other logical units that are not completely utilized (e.g., less than 100% occupied), may be utilized. Without the sharing of the write buffer, alternatives may include resizing the initial buffer or writing the write requests to another buffer type that is available but that has lower write performance. Both of these have offer lower performance than the sharing of LUNs described in this disclosure. Thus, the techniques described herein may reduce underutilization of available buffers, latencies associated with resizing the full buffer, and/or negatively impacting performance for write operations. Although resizing buffers and using additional buffers are described as alternatives to sharing a write buffer, the use of aspects of this disclosure relating to sharing a write buffer may be combined with techniques for resizing buffers and/or using additional buffers.

An apparatus in accordance with at least one embodiment includes a memory controller of a host device configured to couple the host device to a memory system through a first interface. The memory controller is configured to perform operations including receiving, by the memory controller of a host device, one or more write requests in a first queue associated with a first logical unit, wherein the first logical unit is associated with at least a first buffer and a second buffer. The memory controller is configured to write the one or more write requests to the first buffer. The memory controller is configured to, in response to a quantity of requests associated with the first buffer reaching a threshold quantity of requests for the first buffer, write the one or more write requests to the second buffer.

In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

In an additional aspect of the disclosure, an apparatus includes a host controller of a host device configured to couple the host device to a memory system through a first interface, the host controller configured to perform operations including transmitting, by the memory controller of a host device to a memory system, a command to configure a logical unit of memory with multiple buffers, such as at least one hybrid write buffer. The operations include transmitting a command to write requests to a first write buffer of a first logical unit of the memory system. The operations include receiving an alert or a notification from the first logical unit (e.g., via a controller of the memory system) that the first write buffer is completely utilized. The operations include transmitting a command to write requests to a second write buffer of the first logical unit since the first write buffer was completely utilized.

In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

Although aspects of this disclosure are described with reference to a write buffer, aspects of this disclosure may likewise be applied to read buffers. Similarly, although aspects are described with reference to a flash memory system operating as a storage device, aspects of this disclosure may likewise be applied to other memory and storage systems.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for storing, retrieving, and organizing data in a memory system. Aspects of this disclosure provide for operations and data structures used in those operations for writing requests to multiple buffers (e.g., write buffers) associated with a logical unit based on buffer resources. For example, a logical unit may be associated with a first buffer, which may be a dedicated buffer for the logical unit, and at least a second buffer. If the first buffer is completely utilized (e.g., full), then incoming or queued write requests for the logical unit may be written to the second buffer. The second buffer may be assigned to other logical units as well, such as a second logical unit. In this manner, buffers associated with other logical units that are empty or not completely utilized, may be efficiently utilized to reduce delays and provide an efficient use of memory resources.

Particular implementations of the subject matter described in this disclosure may be implemented to realize one or more of the following potential advantages or benefits. In some aspects, the present disclosure provides techniques for improved performance of a memory system, such as reducing underutilization of available buffers, reducing power consumption at the memory system, reducing latencies associated with resizing a full buffer, and/or reducing negatively impacting write operations performance that may otherwise occur when using a different type of buffer when a first buffer is full.

Figure 1:
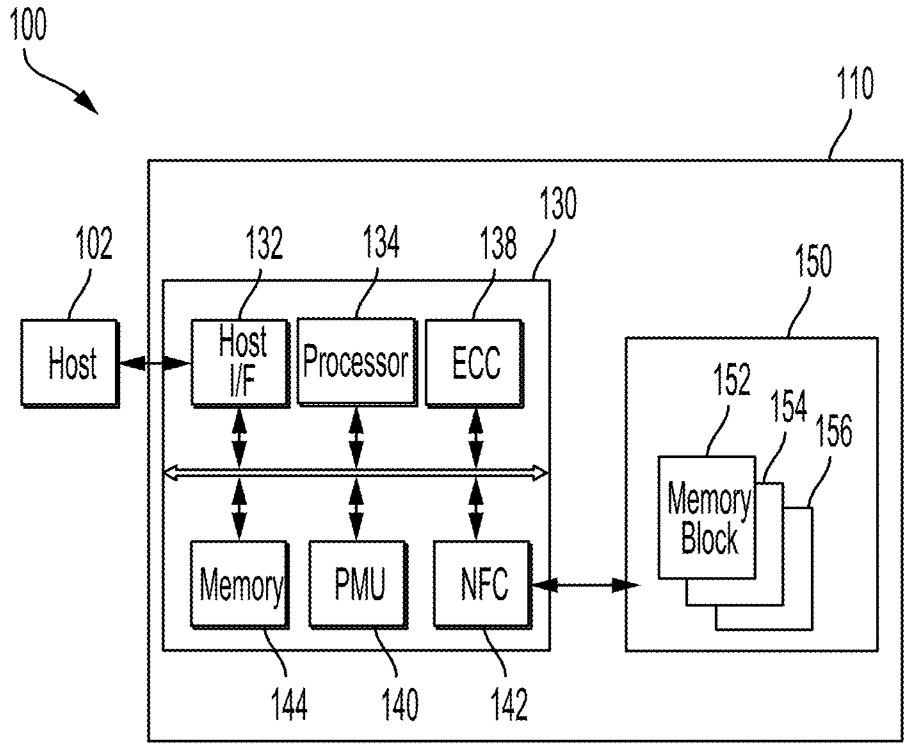
FIG. 1 is a block diagram illustrating a data processing system including a memory system in accordance with an embodiment of the present invention.

Memory may be used in a computing system organized as illustrated in FIG. 1. FIG. 1 illustrates a data processing system 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels. The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. In some examples, the memory system 110 may be included in the host device 102. Thus, the data processing system 100 may be any of the example host devices described herein including the memory system 110. Additional example host devices are illustrated and described with reference to FIG. 6.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (POP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the controller 130 and/or the memory module 150.

The host interface unit 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host interface 132 may be a parallel interface such as an MMC interface, or a serial interface such as an ultra-high speed class 1 (UHS-I)/UHS class 2 (UHS-II) or a universal flash storage (UFS) interface.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the controller 130 and the memory module 150 to allow the controller 130 to control the memory module 150 in response to a commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented, for example, with a microprocessor or a central processing unit (CPU), or an application-specific integrated circuit (ASIC).

Figure 2:
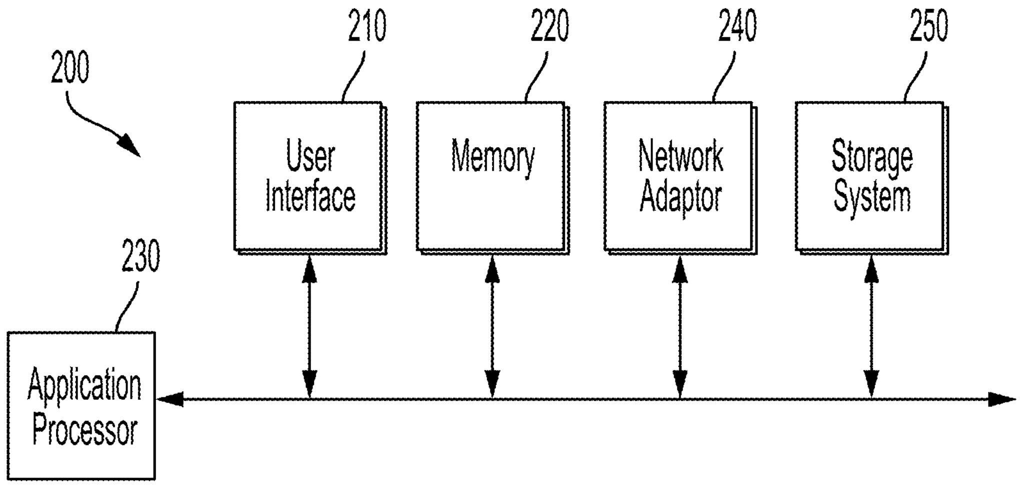
FIG. 2 is a block diagram illustrating an example electronic device including the memory system according to one or more aspects of the disclosure.

FIG. 2 is a block diagram illustrating an example electronic device including the memory system 110 according to one or more aspects of the disclosure. The electronic device 200 may include a user interface 210, a memory 220, an application processor 230, a network adaptor 240, and a storage system 250 (which may be one embodiment of the memory system 110 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMOLED) display device, a light emitting diode (LED), a speaker, or a haptic motor.

Figure 3:
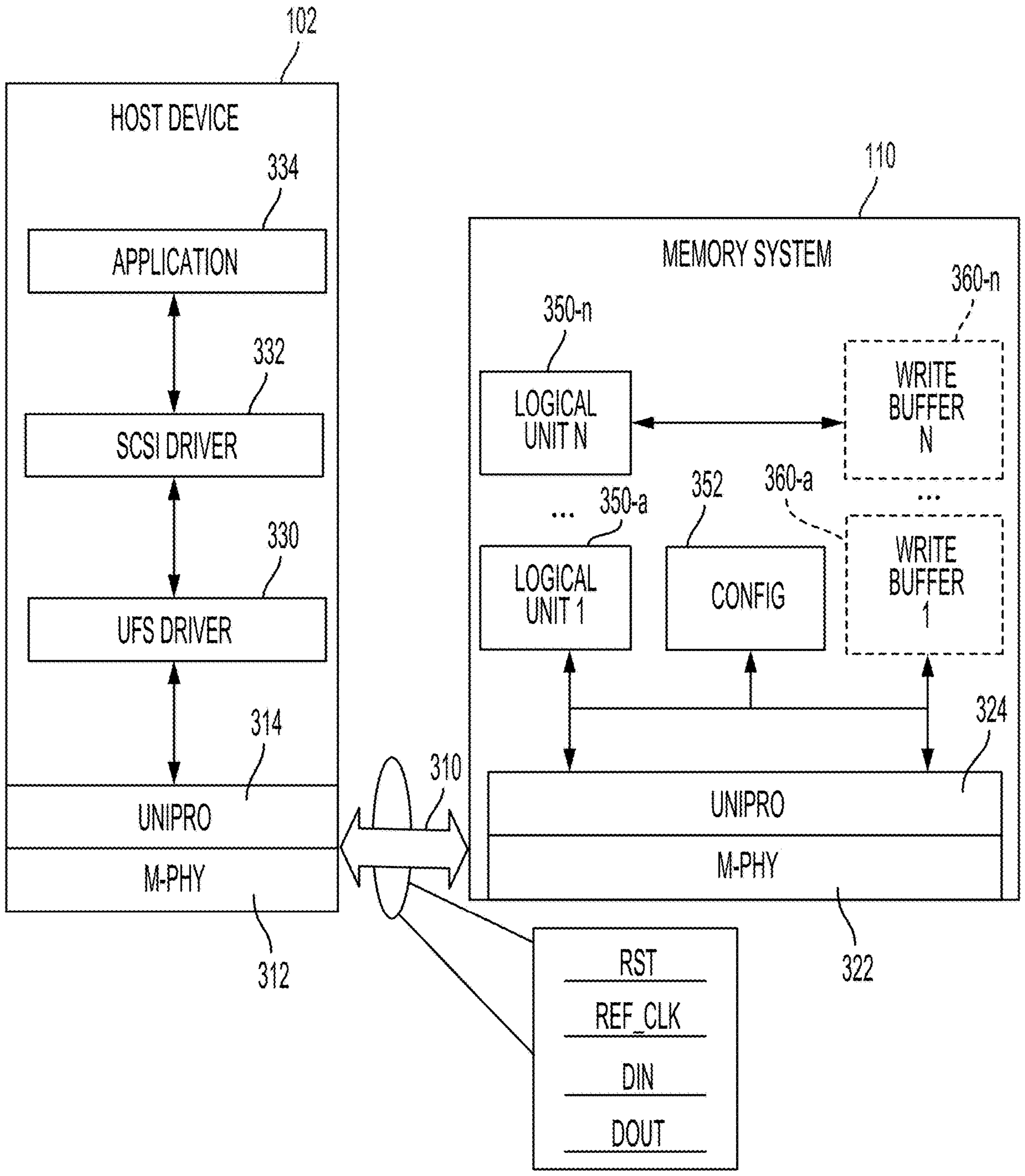
FIG. 3 is a block diagram illustrating components for facilitating access to a flash memory device from a host device according to some embodiments of the disclosure.

FIG. 3 is a block diagram illustrating components for facilitating access to a flash memory system from a host device according to some embodiments of the disclosure. The host device 102 accesses the memory system 110 through a memory interface 310. The first interface may, for example, be a memory interface such as a physical interface (PHY) connecting the host device 102 to the memory system 110. The host device 102 may include physical layer access block 312, which is configured to generate signals for output to the memory interface 310 and process signals received through the memory interface 310. The memory system 110 includes a similarly-configured physical layer access block 322 for communicating on the memory interface 310. One example physical layer specification for communicating on the memory interface 310 is the MIPI M-PHY™ physical layer specification.

The host device 102 also includes a data link layer block 314 configured to format frames of data for transmission on the memory interface 310. The frames may be provided to the physical layer access block 312 for transmission. The data link layer block 314 may receive frames from the physical layer access block 312 and decode frames of data received on the memory interface 310. The memory system 110 includes a similarly-configured data link layer block 324 for processing frames transmitted on or received on the memory interface 310 by the physical layer access block 322. One example data link protocol for communicating on a MIPI M-PHY™ physical link is the MIPI UNIPRO™ specification.

The memory system 110 includes N logical units 350 *a-n* comprising logical memory blocks for storing information including user data (e.g., user documents, application data) and configuration data (e.g., information regarding operation of the memory system 110). The logical units 350 *a-n* may map to portions of the physical memory blocks 152, 154, and 156. Some of the logical units 350 *a-n* or portions of the logical units 350 *a-n* may be configured with write protection, with boot capability, as a specific memory type (e.g., default, system code, non-persistent, enhanced), with priority access, or with replay protection as a replay protected memory block (RPMB). The physical layer access block 322 and the data link layer block 324 perform operations of a memory controller for the memory system 110 for storing and retrieving data in logical units 350 *a-n*.

The memory system 110 also includes configuration structures 352. The configuration structures 352 may include information such as configuration descriptors for boot enable (bBootEnable), initial power mode (bInitPowerMode), RPMB active (bRPMBRegionEnable), and/or RPMB region sizes (bRPMBRegion1Size, bRPMBRegion2Size, bRPMBRegion3Size). Such configuration structures and/or parameters may, for example, be configuration structures and/or parameters identified by the UFS standard.

In some examples, the memory system 110 may include N write buffers 360*a*-360*n* (e.g., write buffers). To efficiently utilize the write buffers 360 of the logical units 350, the host device 102 may configure the write buffers 360 as hybrid write buffers. A hybrid write buffer is a write buffer that is configured as available as a write booster for two or more logical units. For example, a first write buffer 360-*a* may be configured as a write buffer for both a first logical unit 350-*a* and a second logical unit 350-*b*. That is, the first write buffer 360-*a* effectively operates as a hybrid that can be commonly associated with both the first logical unit 350-*a* and the second logical unit 350-*b* to use for storing write requests.

Depending on writing traffic of the first logical unit 350-*a* and the second logical unit 350-*b*, the first write buffer 360-*a* may temporarily store data being written to either the first logical unit 350-*a* or the second logical unit 350-*b* prior to the data being stored in either of the logical units. Similarly, the first booster buffer 360-*a* may be reallocated to other logical units 350, such as a third logical unit 350-*c*. That is, the association of write buffers to logical units may be dynamic, such that the association between the write buffers 360 and the logical units 350 may change, for example, depending on a resource need (e.g., present traffic, predicted traffic, etc.) of the associated logical units 350 or other components of the memory system 110. As an example, the first write buffer 360-*a* may no longer be associated with the first logical unit 350-*a* and instead, be updated to be associated with a third logical unit 350-*c* for example, based on traffic conditions (e.g., quantity of write requests) associated with the first logical unit 350-*a*, the second logical unit 350-*b*, and the third logical unit 350-*c*.

The host device 102 may configure the memory system 110 with a mapping of hybrid write buffers 360 to logical units 350. The mapping may indicate the write buffers 360 that may be used by each of the logical units 350, as discussed with respect to FIG. 4A (e.g., a first logical unit 350-*a* mapped to a first write buffer 360-*a* and a second write buffer 360-*b*, a second logical unit 350-*b* mapped also to the first write buffer 360-*a* and the second write buffer 360-*b*, a third logical unit 350-*c* mapped to the first write buffer 360-*a* and a third write buffer 360-*c*, and so forth).

Using hybrid write buffers 360 associated with different logical units 350 increases the write buffer size associated with a logical unit 350. The host device 102 may configure the logical units 350 with the hybrid write buffers 360 during provisioning (e.g., UFS provisioning). The configuration enables a logical unit 350 to use write buffers of another logical unit 350. The configuration may include setting a configuration parameter bHydriden to 1, enabling hybrid write buffers for the logic units. The configuration may also include a parameter bHybridTWconfig that enables specific write buffers 360 for respective logical units 350 (e.g., maps the logical unit to associated write buffers). For example, the parameter bHybridTWconfig may be an 8 bit register at IDN 20h that is set to enable the particular write buffer 360 for a logical unit 350, as showing in the following table. The bits may be reset so that different write buffers 360 are associated with different logical units 350 (e.g., dynamic configuration and mapping).

TABLE 1

Register Configuration for LUN-TWB Mapping

| Logical Unit | 8-bit register | Corresponding Buffers |
|---|---|---|
| LUN0 | 00000011 | TWB 0, TWB1 |
| LUN1 | 00000010 | TWB1 |
| LUN2 | 00000101 | TWB 2, TWB0 |
| LUN3 | 00001000 | TWB3 |

The host device 102 may be configured to execute one or more applications 334, such as user applications executed by an operating system under the control of a user to receive user input and provide information stored in the memory system 110 to the user. The host device 102 may include several components for interfacing the application 334 to the memory system 110 through the memory interface 310. For example, a SCSI driver 332 and a UFS driver 330 may interface the application 334 to a host memory controller that includes the data link layer block 314 and the physical layer access block 312. The SCSI driver 332 may execute at an application layer for handling transactions requested by the application 334 with the memory system 110. The UFS driver 330 may execute at a transport layer and manage operation of the data link layer block 314, such as to operate the memory interface 310 at one of a plurality of modes of operations. The modes of operations may include two or more gear settings, such as one or more PWM-GEAR settings and four or more HS-GEAR settings specifying one bitrate from 182 MBps, 364 MBps, 728 MBps, and 1457 MBps.

The memory interface 310 may include one or more lines including a reset RST line, a reference clock REF_CLK line, a data-in DIN line (for data transmissions from the host device 102 to the memory system 110), and a data-out DOUT line (for data transmissions from the memory system 110 to the host device 102). The DIN and DOUT lines may be two separate conductors, or the DIN and DOUT lines may include multiple conductors. In some embodiments, the DIN and DOUT lines may be asymmetric with the DIN line including N conductors and the DOUT line including M conductors, with N>M or M>N.

The UFS driver 330 may generate and decode packets to carry out transactions requested by the application 334. The packets are transmitted over the memory interface 310. The packets may be formatted as UFS Protocol Information Units (UPIUs). In a transaction with the memory system 110, the host device 102 is an initiator and the memory system 110 is a target. The UFS driver 330, based on the type of transaction, may form one of several types of UPIUs for handling SCSI commands, data operations, task management operations, and/or query operations. Each transaction may include one command UPIU, zero or more DATA IN or DATA OUT UPIUs, and a response UPIU. Each UPIU may include a header followed by optional fields depending on the type of UPIU.

One example transaction is a read operation. A read transaction may include the initiator (e.g., host device 102) transmitting a command UPIU for causing the target (e.g., memory system 110) to perform a read operation requested by the application 334. The target provides one or more DATA IN UPIUs in response to the command UPIU, in which the DATA IN UPIUs include the requested data. The read transaction is completed by the target transmitting a Response UPIU.

Another example transaction is a write operation. A write operation may include the initiator (e.g., host device 102) transmitting a command UPIU for causing the target (e.g., memory system 110) to perform a write operation requested by the application 334. The target provides a Ready to Transfer UPIU signaling the initiator to begin transfer of write data. The initiator then transmits one or more DATA OUT UPIUs, which are followed by a Ready to Transfer UPIU signaling the initiator to continue transfer of the write data. The sequence of DATA OUT UPIUs and Ready to Transfer UPIU continues until all write data is provided to the target, after which the target provides a Response UPIU to the initiator.

A further example transaction is a query operation. A query operation may include the initiator (e.g., host device 102) requesting information about the target (e.g., memory system 110). The initiator may transmit a Query Request UPIU to request information such as configuration, enumeration, device descriptor, flags, and/or attributes of the target. Example query operations include read descriptor, write descriptor, read attribute, write attribute, read flag, set flag, clear flag, and/or toggle flag. Example descriptors include device, configuration, unit, interconnect, string, geometry, power, and/or device health. Example flags include fDeviceInit, fPermanenetWPEn, fPowerOnWPEn, fBackgroundOpsEn, fDeviceLifeSpanModeEn, fPurgeEnable, fRefreshEnable, fPhyResourceRemoval, fBusyRTC, and/or fPermanentlyDisableFwUpdate. Example attributes include bBootLunEn, bCurrentPowerMode, bActiveIC- CLevel, bOutOfORderDataEn, bBackgroundOpStatus, bPurgeStatus, bMaxDataInSize, bMaxDataOutSize, dDynCapNeeded, bRefClkFreq. Such flags may, for example, be flags identified by the UFS standard.

The operations and capabilities described above may be used for a memory system that supports efficiently utilizing and distributing buffers to logical units of the memory device based on buffer utilization.

Figure 4A:
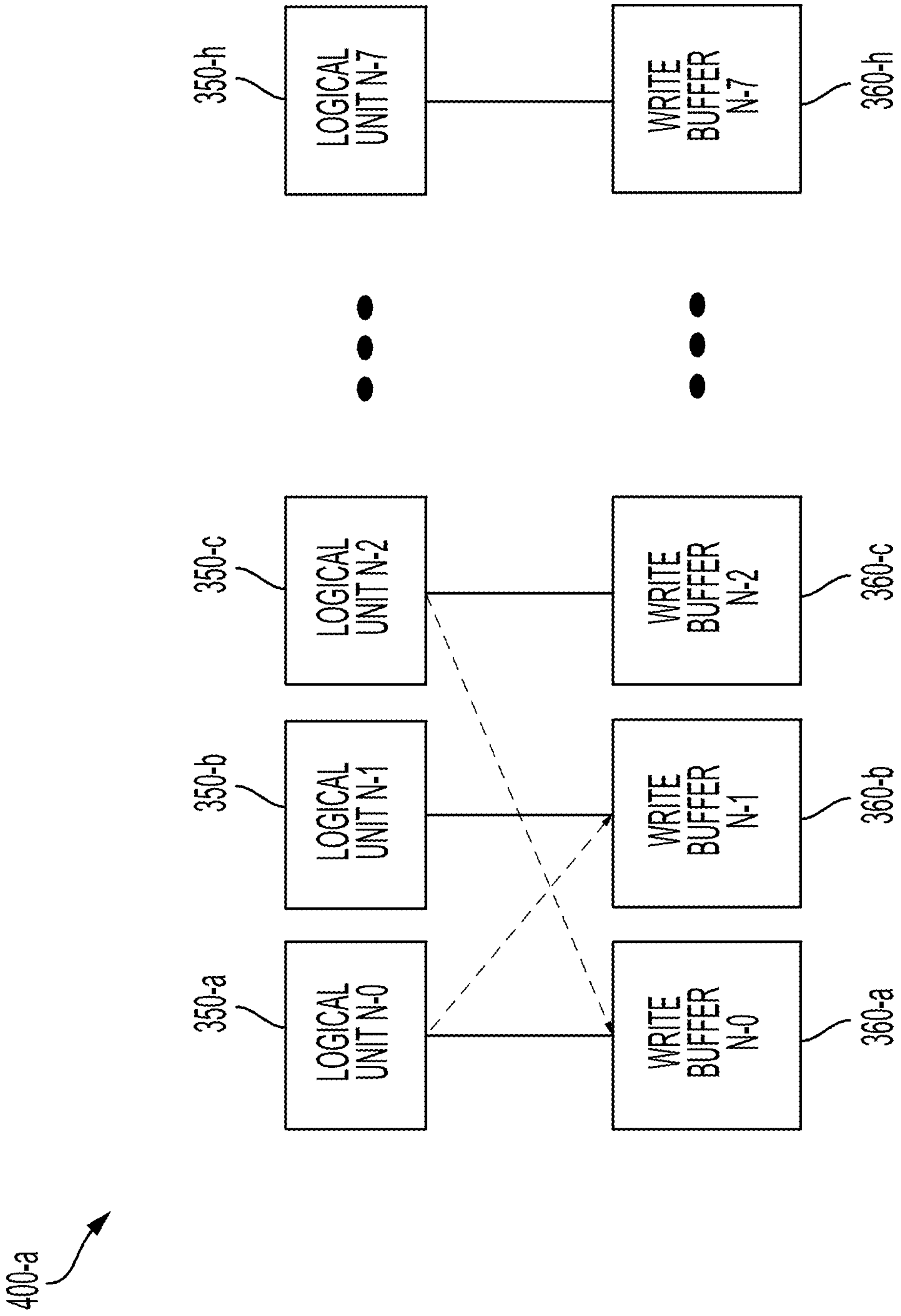
FIG. 4A is a block diagram illustrating a hybrid buffer mode of a memory system according to some embodiments of the disclosure.

FIG. 4A is a block diagram 400-*a* illustrating an example hybrid buffer configuration for the memory system 110. In the depicted example, the hybrid buffer mode of the memory system 110 includes a first logical unit 350-*a* (Logical Unit N−0), a second logical unit 350-*b* (Logical Unit N−1), and a third logical unit 350-*c* (Logical Unit N−2), through an eighth logical unit 350-*h* (Logical Unit N−7). The hybrid buffer mode of the memory system 110 may also include a first write buffer 360-*a* (Write Buffer N−0), a second write buffer 360-*b* (Write Buffer N−1), and a third write buffer 360-*c* (Write Buffer N−2), through an eighth write buffer 360-*h* (Write Buffer N−0).

The first write buffer 360-*a* is a dedicated buffer of the first logical unit 350-*a* (as indicated by the solid line). The first logical unit 350-*a* can also use the second write buffer 360-*b* (as indicated by the dashed line). For example, depending on the traffic at the first write buffer 360-*a* (e.g., consumption charges), the first logical unit 350-*a* may use the first write buffer 360-*a*, the second write buffer 360-*b*, or both. Other write buffers 360 may function similarly. For example, based on traffic at a mapped buffer, the second logical unit 350-*b* can use the first buffer 360-*a* and/or the second buffer 360-*b*, the second third unit 350-*c* can use the first buffer 360-*a* and/or the third buffer 360-*c*.

That is, the write buffers 360 are hybrid buffers since they operate in a hybrid manner based on utilization by multiple logical units 350 (e.g., hybrid among all the multiple logical units 350). Without using the hybrid buffer (e.g., and instead using a dedicated write buffer or a shared buffer), once the single write buffer 360 of a logical unit 350 is completely utilized, the logical unit 350 may wait for the single write buffer 360 to clear or the logical unit 350 may write the write requests to a TLC storage of the memory system 110. The TLC storage may store up to three bits per cell but may result in decreased performance and endurance with respect to a single level cell (SLC) storage. The write buffers 360 may be SLC storage blocks. For example, SLC write buffers 360 may store one bit of information per cell (e.g., a 0 or 1) and, as a result, the data of the write requests may be written and/or retrieved faster. Thus, by using hybrid buffers that are SLC blocks, requests may be efficiently written and/or read. For example, a queue of pending write requests and a completely utilized write buffer 360 may be alleviated by writing the pending write requests to another write buffer 360 assigned to the logical unit 350.

Figure 4B:
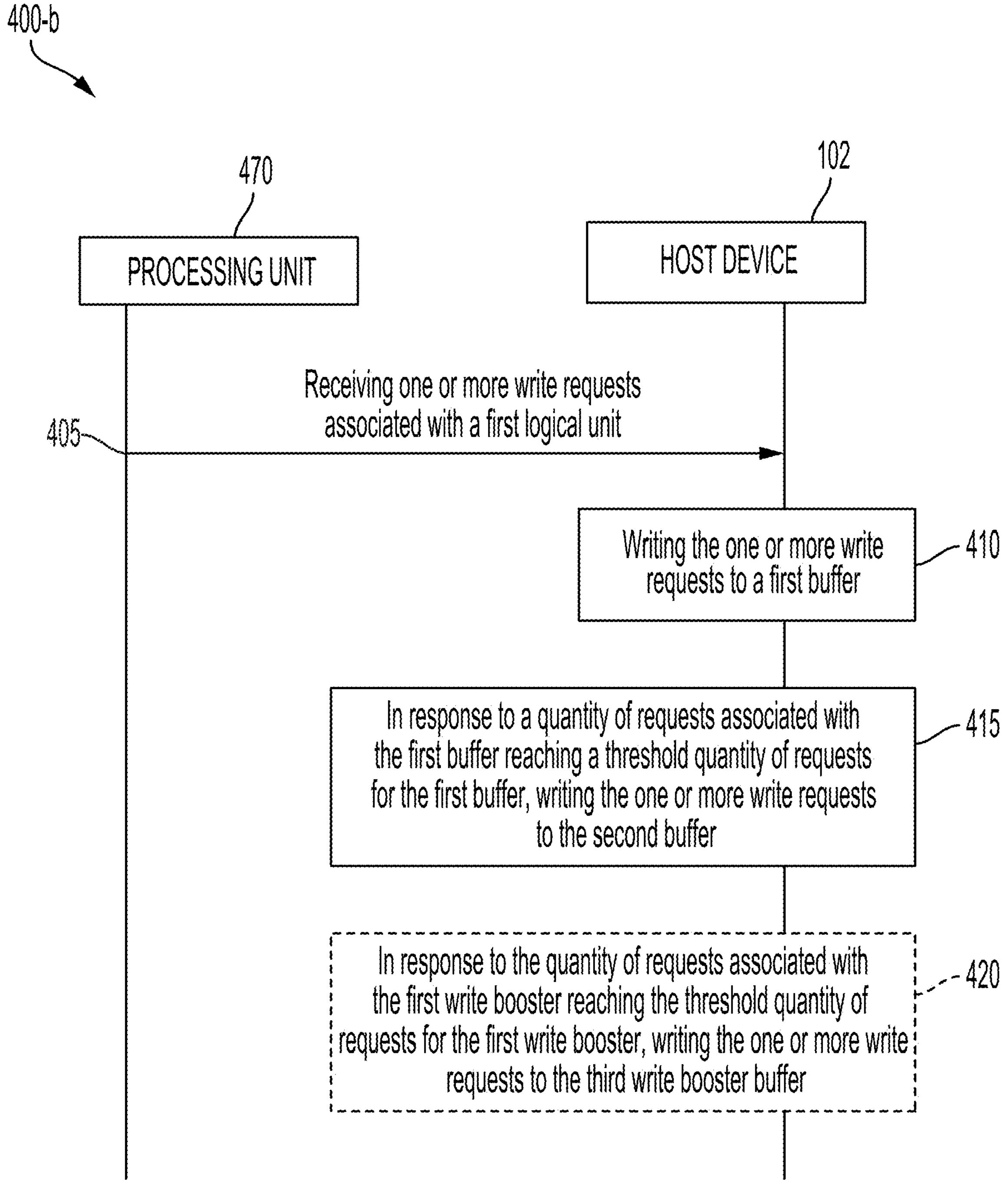
FIG. 4B is a flow chart illustrating process flow according to some embodiments of the disclosure.

FIG. 4B is a flow chart illustrating process flow 400-*a*. The process flow 400-*a* may implement aspects of or may be implemented by aspects of the data processing system 100, the host device 102, and/or a processing unit 470 (e.g., CPU directly or communicatively coupled to the host device 102). For example, the process flow 400-*a* may include a host device 102 as described herein. In the following description of the process flow 400, the operations performed by the processing unit 470 and the host device 102 may be performed in different orders or at different times than the exemplary order shown. Some operations may also be omitted from the process flow 400-*a*, or other operations may be added to the process flow 400-*a*. Further, while operations in the process flow 400-*a* are illustrated as being performed by the processing unit 470 and the host device 102, the examples herein are not to be construed as limiting, as the described features may be associated with any quantity of different device.

At step 405, the host device 102 may receive, by the memory controller of the host device 102, and from the processing unit 470, one or more write requests in a first queue associated with a first logical unit (e.g., of the memory system 110 of FIG. 1). The first logical unit may be associated with at least a first buffer (e.g., such as a write buffer comprising SLC memory cells) and a second buffer (e.g., another write buffer comprising SLC memory cells). The first logical unit and the second logical unit may include respective portions of a flash memory, each comprising TLC or MLC memory cells.

At step 410, the host device 102 may write the one or more write requests to the first buffer. At step 415, the host device 102 may, in response to a quantity of requests associated with the first buffer reaching a threshold quantity of requests for the first buffer, write the one or more write requests to the second buffer.

In some examples (as indicated by the dashed line), at step 420, when the first logical unit is associated with a third buffer, the host device 102 may, in response to the quantity of requests associated with the first buffer reaching the threshold quantity of requests for the first buffer, write the one or more write requests to the third buffer based on the third buffer including a storage capacity greater than the second buffer. In some examples, the host device 102 (e.g., during configuration of the logical units 350 of the memory system 110) may associate the first logical unit 350-*a* with the second buffer or the third buffer based on a quantity of traffic associated with the one or more write requests, a size of the one or more write requests, a quantity of the one or more write requests, or any combination thereof. In some examples, each of the write buffers may be associated with a set of SLCs. In some examples, additional steps may allow further requests to be buffered not only to a secondary write buffer but to additional write buffers, e.g., a tertiary or quaternary write buffer. For example, after step 415, an additional step of in response to a quantity of requests associated with the second buffer reaching a threshold quantity of requests for the second buffer, writing some of the one or more write requests to a third buffer.

In some examples, the first logical unit may be associated with the first buffer, the second buffer, or a combination thereof, based on metadata configured on a device (e.g., bit register setting). The metadata may include an eight bit register. In some examples, the first buffer may include a dedicated buffer for the first logical unit.

In some examples, the host device 102 may read a register value, enter a hybrid buffer mode based on the register value, and configure the first logical unit according to metadata associated with the register value based on the metadata specifying the hybrid buffer mode associating at least one logical unit with at least two buffers. The memory controller may couple the host device 102 to a memory system (e.g., memory system 110) of a flash memory device configured as a UFS device.

Figure 4C:
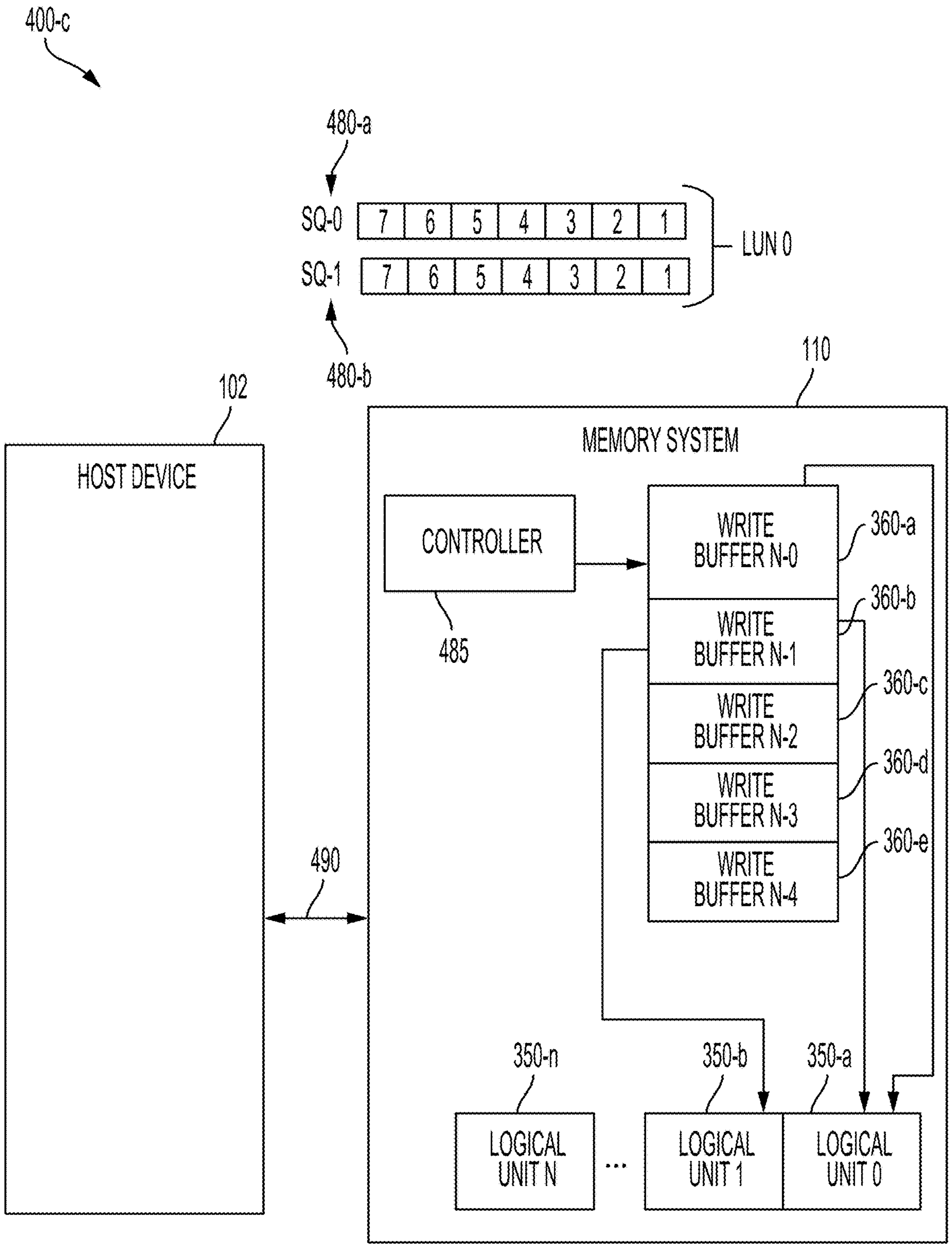
FIG. 4C is a call diagram illustrating a data transfer using the hybrid buffer according to some embodiments of the disclosure.

FIG. 4C is a call diagram 400-*c* illustrating a data transfer using the hybrid buffer (e.g., hybrid write buffer). The host device 102 configures the logical units 350*a*-350*n* to use hybrid buffers, such that each of the logical units 350-*a* may use at least two write buffers 360. For example, the write buffers 360 may include a first write buffer 360-*a* (Write Buffer N−0), a second write buffer 360-*b* (Write Buffer N−1), a third write buffer 360-*c* (Write Buffer N−2), a fourth write buffer 360-*d* (Write Buffer N−3), and a fifth write buffer 360-*d* (Write Buffer N−4). In this example, the first logical unit 350-*a* may write to a first write buffer 360-*a* and a second write buffer 360-*b*, and a second logical unit 350-*b* may also write to the second write buffer 360-*b*. Accordingly, the second write buffer 360-*b* is configured as a hybrid buffer.

The host device 102 may communicate with the memory system 110 (e.g., configure) via a communication interface 490 (e.g., memory interface 310 of FIG. 3). In some cases, the communication may be received by a controller 485 of the memory system 110 that controls the logical units 350 and the write buffers 360. The communication may include a configuration to configure the logical units 350 with multiple write buffers 360, some of which may be hybrid write buffers (e.g., able to serve multiple logical units 350, for example, based on traffic associated with the logical units 350).

In some examples, using the communication interface 490, the host device 102 may communicate a first sequence of write requests 480-*a* and a second sequence of write requests 480-*b* for the first logical unit 350-*a* (LUN 0). The first logical unit 350-*a* may write the first sequence of write requests 480-*a* to the first write buffer 360-*a* and the first write buffer 360-*a* may be completely utilized. When the host device 102 communicates (e.g., sends command to write) the second sequence of write requests 480-*b* to the first logical unit 350-*a*, the controller 485 of the memory system 110 may communicate to the host device 102 that the first write buffer 360-*a* is completely utilized. For example, the controller 485 may communicate a response UFS protocol information unit (UPIU) (e.g., a transfer response) indicating that the first write buffer 360-*a* is completely utilized (e.g., Event_Alert bit=1). A new write buffer 360 flush request may be initiated at the host device 102 submission queue, and the request may be added to a list of existing commands. The request may cause the first logical unit 350-*a* to use the second write buffer 360-*b* for upcoming write requests.

Accordingly, the first logical unit 350-*a* may write the second sequence of write requests 480-*b* to the second write buffer 360-*b* (e.g., a hybrid buffer also shared with the second logical unit 350-*a*), which has at least enough storage for the second sequence of write requests 480-*b*. In this manner, the write buffer storage of the first logical unit 350-*a* is effectively increased using a hybrid buffer when an event occurs. In some examples, the event may be that the write requests have reached a threshold of write requests that can be written to a write buffer 360, such as the first write buffer 360-*a*.

Figure 5:
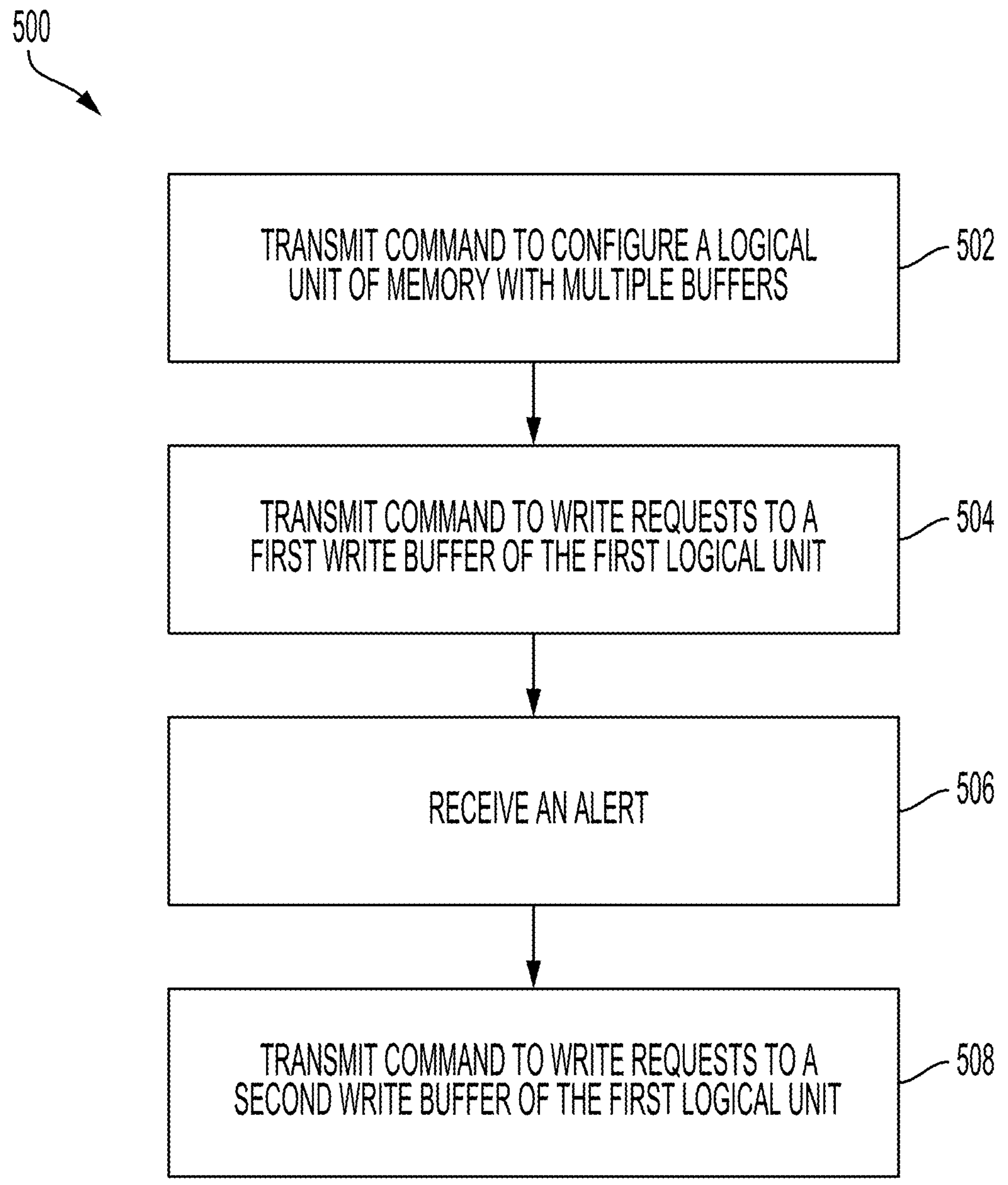
FIG. 5 is flow chart illustrating a method for utilizing hybrid buffers by a host controller according to some embodiments of the disclosure.

FIG. 5 is a flow chart illustrating a method for utilizing hybrid buffers by a host controller according to some embodiments of the disclosure. A method 500 includes, at block 502, transmitting, by the memory controller of a host device to a memory system, a command to configure a logical unit of memory with multiple buffers, such as at least one hybrid write buffer. The hybrid write buffer may be used by multiple logical units, as discussed herein. The command at block 502 may include configuring a device descriptor to configure the memory system for operation with hybrid write buffers. For example, a device descriptor at offset location 54h corresponding to a bWriteBoosterBufferType may be configured with value 02h to specify a hybrid write buffer configuration. Other possible values for the configuration are 00h corresponding to dedicated write buffers for each logical unit and 01h corresponding to a single shared buffer for all logical units. The command at block 502 may also include configuring the specific write buffer to logical unit mappings. For example, XML-formatted configuration data may be provided to the memory system as a UFS Provisioning file, in which the configuration data specifies a number of logical units, a buffer size for each logical unit, an indicator for whether the buffer is set for hybrid configuration, and if hybrid configuration is set which logical units share the buffer.

At block 504, the memory controller may transmit a command to write requests to a first write buffer of a first logical unit of the memory system. The write requests may include one or more sequences of write requests for the first logical unit, such as by queuing operations in a submission queue corresponding to the first logical unit.

At block 506, the memory controller may receive an alert or a notification from the first logical unit (e.g., via a controller of the memory system) that the first write buffer is completely utilized.

At block 508, the memory controller may transmit a command to write requests to a second write buffer of the first logical unit since the first write buffer was completely utilized.

In some examples, the first logical unit may be associated with a third write buffer and the first logical unit may use the third write buffer instead of the second write buffer for writing requests. For example, the memory controller may use a priority rule. The priority rule may include that the first logical unit is to use a write buffer that has the greatest storage space (e.g., completely available and unused) of the write buffers associated with the first logical unit. The priority rule may additionally, or alternatively, be based on a quantity of traffic associated with the one or more write requests, a size of the one or more write requests, a quantity of the one or more write requests, or any combination thereof.

Figure 6:
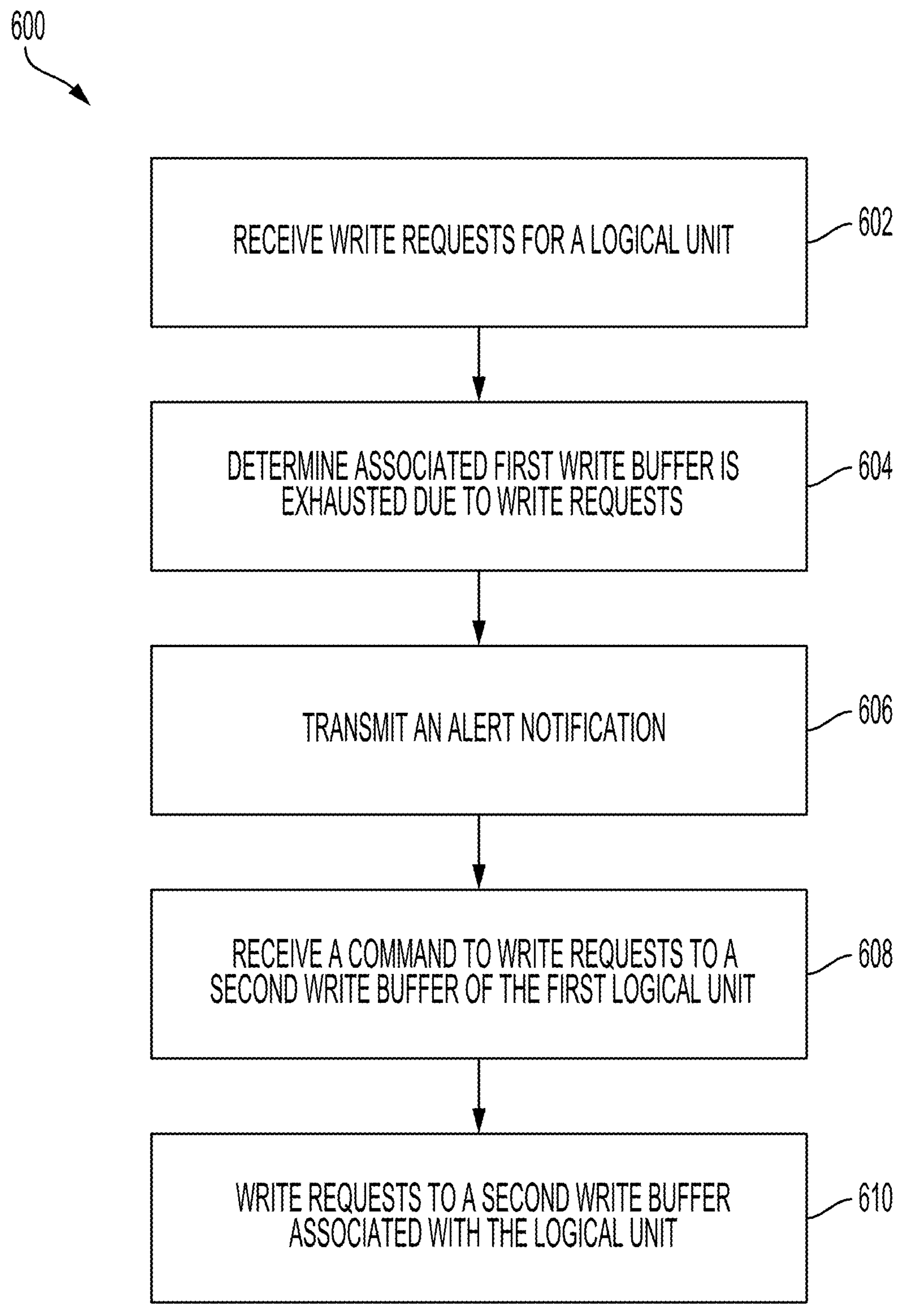
FIG. 6 is a flow chart illustrating a method for utilizing hybrid buffers by a flash memory device according to some embodiments of the disclosure.

FIG. 6 is a flow chart illustrating a method for utilizing hybrid buffers by a flash memory system according to some embodiments of the disclosure. The flash memory may include a first logical unit that has been configured to write requests using multiple write buffers. A method 600 includes, at block 602, receiving, from a host device, one or more sequences of write requests for a first logical unit of the flash memory system. At 604, the flash memory system may determine (e.g., via the logical unit or the write buffer) that a first write buffer is completely utilized, such that additional write requests cannot be written to the first write buffer.

At block 606, the flash memory system may transmit an alert or notification indicating that the first write buffer is completely utilized.

At block 606, the flash memory system may receive a command to write requests to a second write buffer of the first logical unit. The second write buffer may be a hybrid buffer that is shared with other logical units and is used when the first write buffer for the first logical unit is completely utilized. At block 610, the memory system may write the additional write requests to the second write buffer.

Figure 7:
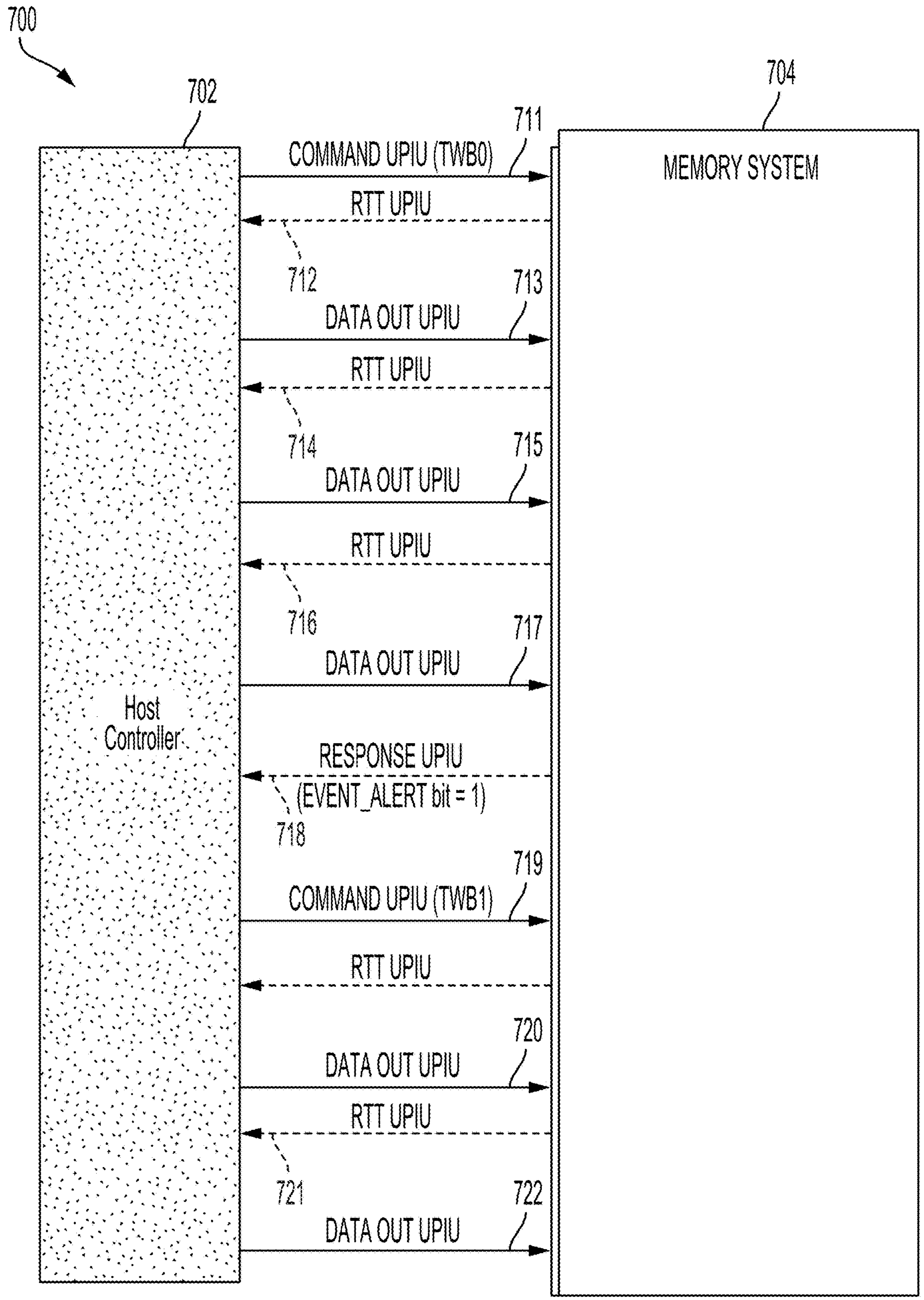
FIG. 7 is a flow chart illustrating an example operation flow involving the Universal Flash Storage (UFS) protocol operating with hybrid write buffers according to some embodiments of the disclosure.

FIG. 7 is a flow chart illustrating an example operation flow involving the Universal Flash Storage (UFS) protocol operating with hybrid write buffers according to some embodiments of the disclosure. Method 700 includes the host controller 702, at step 711, transmitting a command UPIU for a first write buffer, followed by the memory system 704 responding with a ready to transmit (RTT) UPIU at step 712. The host controller 702 then transmits data in a sequence of Data Out UPIUs followed by RTT UPIU responses at steps 713, 714, 715, 716, and 717. At step 718, the memory system 704 responds with a Response UPIU setting an alert through an EVENT_ALERT bit set to one. The Response UPIU indicates to the host controller 702 that a criteria has been satisfied for the write buffer associated with the first write buffer specified in the COMMAND UPIU of step 701. The host controller 702 then sends a Command UPIU at step 719 to specify a second write buffer. The memory system 704 responds with a RTT UPIU, and the host controller 702 continues transmission of data followed by RTT UPIUs at steps 720, 721, and 722.

Figure 8:
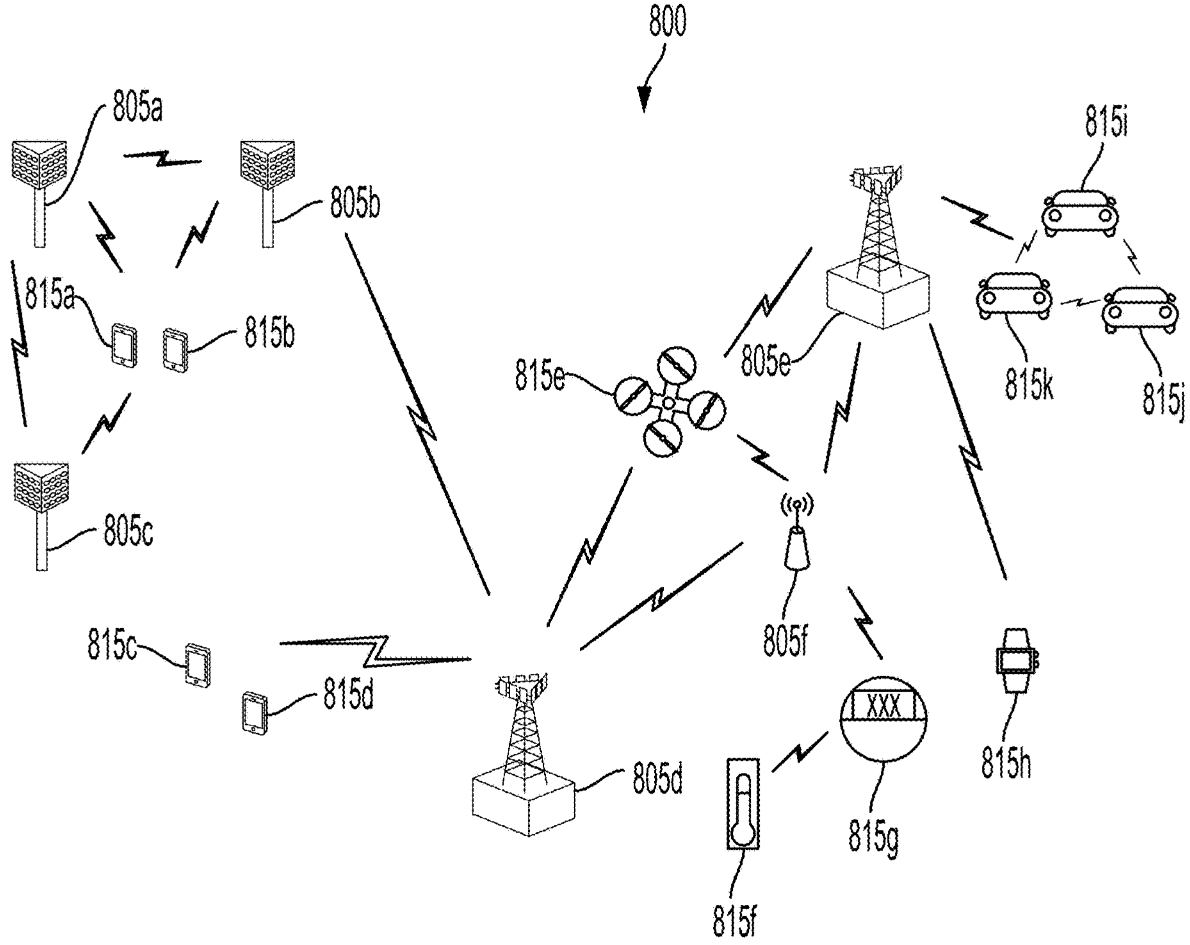
FIG. 8 is a block diagram illustrating details of an example wireless communication system according to one or more aspects.

Operations of method 500, method 600, or method 700 may be performed by a UE, such as a UE described with reference to FIG. 8. For example, example operations (also referred to as "blocks") of method 500 or method 600 may enable UE 815 to support greater user data confidentiality. FIG. 8 is a block diagram illustrating details of an example wireless communication system according to one or more aspects. The wireless communication system may include wireless network 800. Wireless network 800 may, for example, include a 5G wireless network. As appreciated by those skilled in the art, components appearing in FIG. 8 are likely to have related counterparts in other network arrangements including, for example, cellular-style network arrangements and non-cellular-style-network arrangements (e.g., device to device or peer to peer or ad hoc network arrangements, etc.).

Wireless network 800 illustrated in FIG. 8 includes a number of base stations 805 and other network entities. A base station may be a station that communicates with the UEs and may also be referred to as an evolved node B (eNB), a next generation eNB (gNB), an access point, and the like. Each base station 805 may provide communication coverage for a particular geographic area. In 3GPP, the term "cell" may refer to this particular geographic coverage area of a base station or a base station subsystem serving the coverage area, depending on the context in which the term is used. In implementations of wireless network 800 herein, base stations 805 may be associated with a same operator or different operators (e.g., wireless network 800 may include a plurality of operator wireless networks). Additionally, in implementations of wireless network 800 herein, base station 805 may provide wireless communications using one or more of the same frequencies (e.g., one or more frequency bands in licensed spectrum, unlicensed spectrum, or a combination thereof) as a neighboring cell. In some examples, an individual base station 805 or UE 815 may be operated by more than one network operating entity. In some other examples, each base station 805 and UE 815 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 8, base stations 805*d* and 805*e* are regular macro base stations, while base stations 805*a*-805*c* are macro base stations enabled with one of 3 dimension (3D), full dimension (FD), or massive MIMO. Base stations 805*a*-805*c* take advantage of their higher dimension MIMO capabilities to exploit 3D beamforming in both elevation and azimuth beamforming to increase coverage and capacity. Base station 805*f* is a small cell base station which may be a home node or portable access point. A base station may support one or multiple (e.g., two, three, four, and the like) cells.

Wireless network 800 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 815 are dispersed throughout the wireless network 800, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 815, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a flying device, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 815*a*-815*d* of the implementation illustrated in FIG. 8 are examples of mobile smart phone-type devices accessing wireless network 800. A UE may also be a machine specifically configured for connected communication, including machine type communication (MTC), enhanced MTC (eMTC), narrowband IoT (NB-IOT) and the like. UEs 815*e*-815*k* illustrated in FIG. 8 are examples of various machines configured for communication that access wireless network 800.

A mobile apparatus, such as UEs 815, may be able to communicate with any type of the base stations, whether macro base stations, pico base stations, femto base stations, relays, and the like. In FIG. 8, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 800 may occur using wired or wireless communication links.

In operation at wireless network 800, base stations 805*a*-805*c* serve UEs 815*a* and 815*b* using 3D beamforming and coordinated spatial techniques, such as coordinated multipoint (CoMP) or multi-connectivity. Macro base station 805*d* performs backhaul communications with base stations 805*a*-805*c*, as well as small cell, base station 805*f*. Macro base station 805*d* also transmits multicast services which are subscribed to and received by UEs 815*c* and 815*d*. Such multicast services may include mobile television or stream video, or may include other services for providing community information, such as weather emergencies or alerts, such as Amber alerts or gray alerts.

Wireless network 800 of implementations supports mission critical communications with ultra-reliable and redundant links for mission critical devices, such UE 815*c*, which is an aeronautical vehicle. Redundant communication links with UE 7815*e* include from macro base stations 805*d* and 805*e*, as well as small cell base station 805*f*. Other machine type devices, such as UE 815*f* (thermometer), UE 815*g* (smart meter), and UE 815*h* (wearable device) may communicate through wireless network 800 either directly with base stations, such as small cell base station 805*f*, and macro base station 805*e*, or in multi-hop configurations by communicating with another user device which relays its information to the network, such as UE 815*f* communicating temperature measurement information to the smart meter, UE 815*g*, which is then reported to the network through small cell base station 805*f*. Wireless network 800 may also provide additional network efficiency through dynamic, low-latency TDD communications or low-latency FDD communications, such as in a vehicle-to-vehicle (V2V) mesh network between UEs 815*i*-815*k* communicating with macro base station 805*c*.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANs.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data storage and/or data transmission, may include additional aspects, such as any single aspect or any combination of aspects described below or in connection with one or more other processes or devices described elsewhere herein. In a first aspect, a memory controller, may be an apparatus as a host device that includes a memory controller configured to couple to an interface to a memory system, in which the memory system may be integrated with the host device or externally coupled to the host device. The memory system may include a memory controller coupled to a memory system through a first channel and configured to access data stored in the memory system through the first channel and coupled to a host device through a first interface and configured to communicate with the host device over the first interface. The operations may be executed as part of an initialization operation, a read operation or a write operation.

In a first aspect, the memory controller of the memory system may be configured to perform operations including receiving, by the memory controller of a host device, one or more write requests in a first queue associated with a first logical unit, wherein the first logical unit is associated with at least a first buffer and a second buffer. The operations include writing the one or more write requests to the first buffer. The operations include, in response to a quantity of requests associated with the first buffer reaching a threshold quantity of requests for the first buffer, writing the one or more write requests to the second buffer.

In a second aspect, in combination with the first aspect, the first buffer and the second buffer comprise respective portions of a flash memory.

In a third aspect, in combination with one or more of the first aspect or the second aspect, each of the first buffer and the second buffer are associated with a plurality of SLC.

In a fourth aspect, in combination with one or more of the first aspect through the third aspect, the first logical unit is associated with a third buffer. In this aspect, the memory controller configured to perform operations including, in response to the quantity of requests associated with the first buffer reaching the threshold quantity of requests for the first buffer, writing the one or more write requests to the third buffer based at least in part on the third buffer comprising a storage capacity greater than the second buffer.

In a fifth aspect, in combination with one or more of the first aspect through the fourth aspect, the memory controller configured to perform operations including associating the first logical unit with the second buffer or the third buffer based at least in part on a quantity of traffic associated with the one or more write requests, a size of the one or more write requests, a quantity of the one or more write requests, or any combination thereof.

In a sixth aspect, in combination with one or more of the first aspect through the fifth aspect, the first logical unit associated with the first buffer, the second buffer, or a combination thereof, is based at least in part on metadata configured on a device.

In a seventh aspect, in combination with one or more of the first aspect through the sixth aspect, the first buffer comprises a dedicated write buffer.

In an eighth aspect, in combination with one or more of the first aspect through the seventh aspect, the memory controller configured to perform operations including reading a register value, entering a hybrid buffer mode based at least in part on the register value, and configuring the first logical unit according to metadata associated with the register value based on the metadata specifying the hybrid buffer mode associating at least one logical unit with at least two buffers.

In a ninth aspect, in combination with one or more of the first aspect through the eighth aspect, the memory controller couples the host device to a memory system comprising a flash memory device configured as a universal flash storage (UFS) device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 4A-C, 5, or 6 may be combined with one or more blocks (or operations) described with reference to another of the figures. For example, one or more blocks (or operations) of FIG. 1 may be combined with one or more blocks (or operations) of FIG. 3. As another example, one or more blocks associated with FIG. 1 may be combined with one or more blocks (or operations) associated with FIG. 4A-C, 5, or 6. Additionally, or alternatively, one or more operations described above with reference to FIGS. 1-3 may be combined with one or more operations described with reference to FIGS. 4-6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:

a memory controller of a host device configured to couple the host device to a memory system through a first interface, the memory controller configured to perform operations including:

receiving, by the memory controller of a host device, one or more write requests in a first queue associated with a first logical unit, wherein the first logical unit is associated with at least a first buffer and a second buffer, wherein the second buffer is configured to be associated with the first logical unit based on a logical unit-to-buffer mapping that indicates which logical units are associated with the second buffer;

writing the one or more write requests to the first buffer; and in response to a quantity of requests associated with the first buffer reaching a threshold quantity of requests for the first buffer, writing the one or more write requests to the second buffer.

2. The apparatus of claim 1, wherein the first buffer and the second buffer comprise respective portions of a flash memory.

3. The apparatus of claim 1, wherein each of the first buffer and the second buffer are associated with a plurality of single level cells (SLC).

4. The apparatus of claim 1, wherein, when the first logical unit is associated with a third buffer, the memory controller configured to perform operations including:

in response to the quantity of requests associated with the first buffer reaching the threshold quantity of requests for the first buffer, writing the one or more write requests to the third buffer based at least in part on the third buffer comprising a storage capacity greater than the second buffer.

5. The apparatus of claim 4, the memory controller configured to perform operations including:

associating the first logical unit with the second buffer or the third buffer based at least in part on a quantity of traffic associated with the one or more write requests, a size of the one or more write requests, a quantity of the one or more write requests, or any combination thereof.

6. The apparatus of claim 1, wherein the first logical unit associated with the first buffer, the second buffer, or a combination thereof, is based at least in part on metadata configured on a device.

7. The apparatus of claim 6, wherein the metadata comprises an eight bit register.

8. The apparatus of claim 1, wherein the first buffer comprises a dedicated write buffer.

9. The apparatus of claim 1, the memory controller configured to perform operations including:

reading a register value;

entering a hybrid buffer mode based at least in part on the register value; and configuring the first logical unit according to metadata associated with the register value based on the metadata specifying the hybrid buffer mode associating at least one logical unit with at least two buffers.

10. The apparatus of claim 1, wherein the memory controller couples the host device to a memory system comprising a flash memory device configured as a universal flash storage (UFS) device.

11. A method, comprising:

receiving, by a memory controller of a host device, one or more write requests in a first queue associated with a first logical unit, wherein the first logical unit is associated with at least a first buffer and a second buffer, wherein the second buffer is configured to be associated with the first logical unit based on a logical unit-to-buffer mapping that indicates which logical units are associated with the second buffer;

writing the one or more write requests to the first buffer; and in response to a quantity of requests associated with the first buffer reaching a threshold quantity of requests for the first buffer, writing the one or more write requests to the second buffer.

12. The method of claim 11, wherein the first buffer and the second buffer comprise respective portions of a flash memory.

13. The method of claim 11, wherein the first buffer and the second buffer are associated with a plurality of single level cells (SLC).

14. The method of claim 11, wherein, when the first logical unit is associated with a third buffer, the method comprising:

in response to the quantity of requests associated with the first buffer reaching the threshold quantity of requests for the first buffer, writing the one or more write requests to the third buffer based at least in part on the third buffer comprising a storage capacity greater than the second buffer.

15. The method of claim 14, the method comprising:

associating the first logical unit with the second buffer or the third buffer based at least in part on a quantity of traffic associated with the one or more write requests, a size of the one or more write requests, a quantity of the one or more write requests, or any combination thereof.

16. The method of claim 11, wherein the first logical unit associated with the first buffer, the second buffer, or a combination thereof, is based at least in part on metadata configured on a device.

17. The method of claim of claim 16, wherein the metadata comprises an eight bit register.

18. The method of claim 11, wherein the first buffer comprises a dedicated write buffer.

19. An apparatus, comprising:

a memory controller:

coupled to a memory module through a first channel and configured to access data stored in the memory module through the first channel; and coupled to a host device through a first interface and configured to communicate with the host device over the first interface, the memory controller configured to perform operations comprising:

receiving, by the memory controller of a host device, one or more write requests in a first queue associated with a first logical unit, wherein the first logical unit is associated with at least a first buffer and a second buffer, wherein the second buffer is configured to be associated with the first logical unit based on a logical unit-to-buffer mapping that indicates which logical units are associated with the second buffer;

writing the one or more write requests to the first buffer; and in response to a quantity of requests associated with the first buffer reaching a threshold quantity of requests for the first buffer, writing the one or more write requests to the second buffer.

20. The apparatus of claim 19, wherein the first buffer and the second buffer comprise respective portions of a flash memory.

* * * * *